(12) United States Patent
Horn et al.

(10) Patent No.: US 8,302,851 B2
(45) Date of Patent: Nov. 6, 2012

(54) AUTOMATED PRINT PRODUCTION

(75) Inventors: Richard Thomas Horn, Claremont, CA (US); Hans Case, Jordan, MN (US)

(73) Assignee: Xerox Corporation, Norwalk, CT (US)

( * ) Notice: Subject to any disclaimer, the term of this patent is extended or adjusted under 35 U.S.C. 154(b) by 294 days.

(21) Appl. No.: 12/640,758

(22) Filed: Dec. 17, 2009

(65) Prior Publication Data

US 2011/0147445 A1   Jun. 23, 2011

(51) Int. Cl.
   *G06F 17/00* (2006.01)
(52) U.S. Cl. ......... 235/375; 235/379; 235/383; 235/384
(58) Field of Classification Search .......... 235/379, 235/383, 384, 375
   See application file for complete search history.

(56) References Cited

U.S. PATENT DOCUMENTS

| | | | |
|---|---|---|---|
| 2002/0022073 A1* | 2/2002 | Soehnlen et al. | 426/393 |
| 2002/0198892 A1 | 12/2002 | Rychel et al. | |
| 2004/0026024 A1* | 2/2004 | Nakasaka et al. | 156/250 |
| 2006/0191426 A1* | 8/2006 | Timmerman et al. | 101/24 |
| 2007/0121158 A1* | 5/2007 | Panunto et al. | 358/1.15 |
| 2007/0164554 A1 | 7/2007 | Krone et al. | |

OTHER PUBLICATIONS

About Contour Creations, LasX Industries, obtained on Jul. 10, 2009 from url: <http://www.lasx.com/print/commercial-print.htm.

* cited by examiner

*Primary Examiner* — Karl D Frech (74) *Attorney, Agent, or Firm* — Pillsbury Winthrop Shaw Pittman, LLP (57) ABSTRACT

A printing system includes a printer configured to render items based on customer requirements; a sorting and packaging system configured to automatically sort and package printed items; and a processor configured to print, sort and package items based on predetermined physical locations within a customer's business establishment where the printed items are to be displayed. A method of printing is also provided.

23 Claims, 8 Drawing Sheets

AUTOMATED PRINT PRODUCTION

FIELD

This application relates to printing, and in particular, automated print production.

BACKGROUND

Major businesses with nationwide distribution may have many stores across the country (or world-wide) and sell a broad range of products. Because each store is different, the location of products within each store typically varies, for instance, on different shelves or aisles. As new products are added, discontinued, moved, and/or prices change, the signs and tags on the shelves or aisles must be routinely changed. Signs and tags may be changed multiple times a week.

It can take quite a few people several hours a day to change all the signs or price tags in a store. Usually "shells" for the signs or tags are pre-printed, such as by offset printing, in monochrome and perforated and shipped to the store. Once the signs or tags arrive at the store, they can be torn on the perforation by hand, as well as manually sorted, organized into order, and placed into sign holders.

Businesses would like to produce signs which are more appealing to customers, as well as make the print production process more cost effective. In addition, businesses, especially with multiple locations, are looking for more efficient and faster methods for obtaining signage for their stores.

SUMMARY

According to one embodiment, a printing system comprises: a printer configured to render items based on customer requirements; a sorting and packaging system configured to automatically sort and package printed items; and a processor configured to print, sort and package items based on predetermined physical locations within a customer's business establishment where the printed items are to be displayed.

According to another embodiment, a method of method comprises: printing items based on customer requirements; and automatically sorting and packaging printed items; wherein printed items are automatically sorted and packaged items based on predetermined physical locations within a customer's business establishment where the printed items are to be displayed.

Other features of one or more embodiments of this disclosure will be apparent from the following detailed description, and accompanying drawings, and the appended claims.

BRIEF DESCRIPTION OF DRAWINGS

Embodiments of the present disclosure will now be disclosed, by way of example only, with reference to the accompanying schematic drawings in which corresponding reference symbols indicate corresponding parts, in which.

DETAILED DESCRIPTION

A printing system includes a printer configured to render items based on customer requirements; a sorting and packaging system configured to automatically sort and package printed items; and a processor configured to print, sort and package items based on predetermined physical locations within a customer's business establishment where the printed items are to be displayed. A method of printing is also provided.

In accordance with an embodiment, job orders may be automatically: received from customers, printed, packaged and shipped to the customer's business establishment. As a result, significant savings in time and resources may be realized by the customer.

The systems and methods disclosed herein may enable rapid production of large layouts using full-color tandem printers, roll feeding, and automated trimming and packaging. The output may be easily configurable through the use of job orders. Different job order components may be stored for future use.

Figure 1:
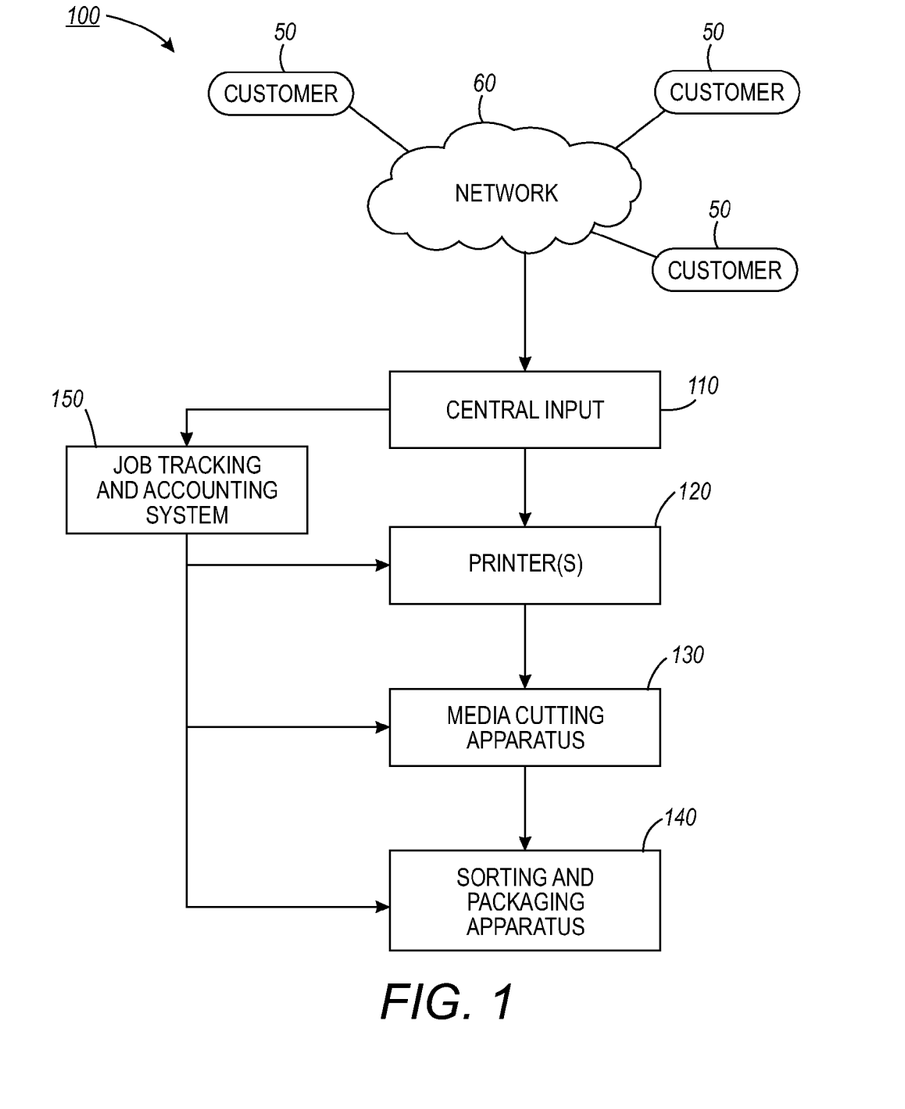
FIG. 1 illustrates a schematic workflow of an automated printing production system in accordance with an embodiment.

FIG. 1 illustrates a schematic workflow of an automated printing production system 100 in accordance with an embodiment.

One or more job orders may received from customers 50 at central input 110. Customers 50 may be located remotely from central input 110 and interface the central input 110 via a network 60, such as the Internet. For example, customers 50 may use a computer or other electronic device to establish a connection to the Internet and access a particular URL associated with a web-site. Of course, other wired and wireless networks may similarly be used. Central input 110 may be a computer system or server connected to the network 60. In some implementations, central input 110 may include software that resides on the main controller of printer(s) 120. Central input 110 may be operated by a single organization for printing items for display at one or all of its business establishments; or central input may be operated by a third party who prints items for one or more customers. In the latter implementation, different establishments of the same organization, might be treated as the same customer or as different customers. A business establishment may include a store, a shop, a restaurant, a factory, a commercial enterprise, or other physical place of business. While reference herein is primarily to stores, it is not to be construed as limiting.

Job orders may include instructions from customers for printing various items. First, the job order may include information about a particular customer, such as, customer name, address, and contact information, and account(s). This data may be stored in the central input 110 for repeat customers. In addition, job orders may include information specific to printing a particular item or items, such as, store location, product description, product price information, item quantity, display location, media type, size, thickness, shape, folding options, gloss, shipping information, deadlines, date/time to remove item from the display location, etc.

In one implementation, print items may correspond to signs for goods and/or services, sold or provided by a business or store. Such signs may including information such as, for example, one or more of: a description of the good/service, price, inventory/tracking number(s), customer information (e.g., business name, logo(s), etc.), vendor/supplier information, information regards sales or other special occasions, etc. Tracking information might also be provided with the signs, such as bar-codes, RFID tags or the like.

Job order information may be transmitted from customers 50, for instance, via a web-based form and/or applet, which might be HTML- or Java-based. For consistency, job order may be transmitted and/or converted into a common data format, such as, for example, Extensible Markup Language (XML).

Customers 50 may upload data and/or use templates, or other software to generate one or more print jobs for items. The printed items may include, among other things, posters, signs (signage), tags, displays, documents, flyers, banners, convenience or letter checks, etc.

Once job order data has been received, one or more processors associated with the central input 110 may interpret and process the data into the correct order and composition for printing. The correct order interpretation can be accomplished in several ways. For example, the data may come in already sorted according to store location, shelf, aisle, etc. In that case, the print ordering may be easier to determine. Or, it may come in with identification of units to print by item, and the central input 110 may sort the job orders according to store and location to be displayed by the customer.

The one or more processors may be dedicated hardware, like an application-specific integrated circuit (ASIC) or field-programmable gate array (FPGAs), software, or combinations thereof. For different methods, the programming may vary. In some implementations, the central input 110 may be configured according to U.S. Patent Application Publication No. 2002/0198892, titled "Method and System for Point of Purchase Sign Creation and Delivery," herein incorporated by reference in its entirety.

To compose the layout for the print jobs, the central input 110 may interpret dimensional information received with the job order or use an identifier passed with the job order that points to a local-lookup table with the required dimensions and or layout configuration. For instance, this may be the number of items that can be most economically or physically printed on a single sheet of media. Otherwise, one or more algorithms may be used to optimize the placement of various items when printed on media, as discussed herein. Once the print order and composition is determined, the print job may be constructed and submitted to a print queue on the printer controller.

The size of the print item may be related to a good or a service associated with the print item, and/or a display location associated with the print item. A look up table (LUT) may be used to relate the size to goods or services and/or display location. In that way, for instance, related products, or aisles in a store, may have same sized signs. Other parameters, such as, type size and font, color, gloss characteristics, etc., may similarly be associated with a good or service, or a display location. This helps ensure consistency throughout stores.

One or more printers 120 are configured to render print jobs. The printer 120 may be a monochrome system, color system, or a combination thereof. In one implementation, the Xerox iGen4® digital printing press may be used. Of course, other printing technologies may also be used, such as for example, ink-jet (bubble jet), laser, offset, solid-ink, dye sublimation, xerography, etc. Thus, any reference to any specific printing technology should not be construed to be limiting.

In some implementations, the printer(s) 120 may render an indicia or barcode on media for tracking purposes. The indicia or barcode may be rendered on a portion of the media that will not interfere with the printed items. For example, placement may be along an edge, in a margin, or on an opposite side thereof. Alternatively, the indicia might include a radio frequency identification (RFID) tag affixed to the media, instead of a printed indicia. In some implementations, the RFID tag could be affixed to the media, for instance, upstream of printer (s) 120.

Additional processing equipment may also be provided, such as a laminator, gloss applicator, media folding apparatus, etc., depending on customer requirements. These processes may be determined by reading or scanning the barcode or other indicia on the media.

After items have been printed, and/or otherwise processed, they may be subjected to a cutting process to separate individual printed items. A cutting system 130 may be used to separate each printed item from other items and/or media.

The cutting profile may be determined by communication between the printer controller and the system controlling the cutting mechanism. In one implementation, a barcode or other indicia on each sheet may be visually interpreted by a sensor provided with the cutting system 130 to retrieve the cutting profile from central input 110. Once cutting has been applied, the individual printed items may be separated from any remaining unwanted material (which may be later discarded or recycled).

Next, cut printed items may be transported, for example, by an automated conveyor, to a sorting and packaging system 140. One such conveyor that may be used for transporting cut items is available from Standard Dynamics, Inc.

The sorting and packaging system 140 may be used to sort, stack and package printed items for specific customers and/or locations. Printed items may be rotated, as necessary, also. While the sorting and packaging system 140 is depicted as one station in FIG. 1, it will be appreciated that, these functions may be performed by one or more individual stations, and/or sub-stations.

Barcodes or other indicia provided media may be detected by a sensor provided with the packaging system 140 to retrieve information regarding packaging and shipping information of customers from job monitoring and accounting system 150 and/or central input 110.

Preferably, the items may be ordered and packaged for delivery to the appropriate store, and more particularly, for a particular location in a store where an item is to be displayed. Such display locations may include, for instance, a particular shelf, aisle, checkout station, door, window, kiosk, or other locations (or portions thereof), as desired. In one implementation, the cut items may be shrink-wrapped and/or boxed for delivery, according to this order.

In addition, boxes and/or packaging may include not only customer information, but particular store and/or display location information. This information may be printed directly on the boxes or packaging, and/or on a label having this information that may be affixed thereto (or a barcode or other indicia corresponding to same). Other packaging or shipping information may also be provided.

Accordingly, clerks unpacking the boxes and packaging and displaying the items at the customer's business establishment, will know immediately what items are packed therein and where those items are to be displayed. This is a significant savings in efficiency. Display instructions may also be included with the packaging to help clerks know when and/or where items are to be displayed therein. For instance, for a particular sale or promotion, items may be displayed for a predetermined time.

Job tacking and accounting system 150 may be used to track the items throughout the production process. Depending on the processing operation(s) performed, customers' accounts may be adjusted accordingly.

Figure 2:
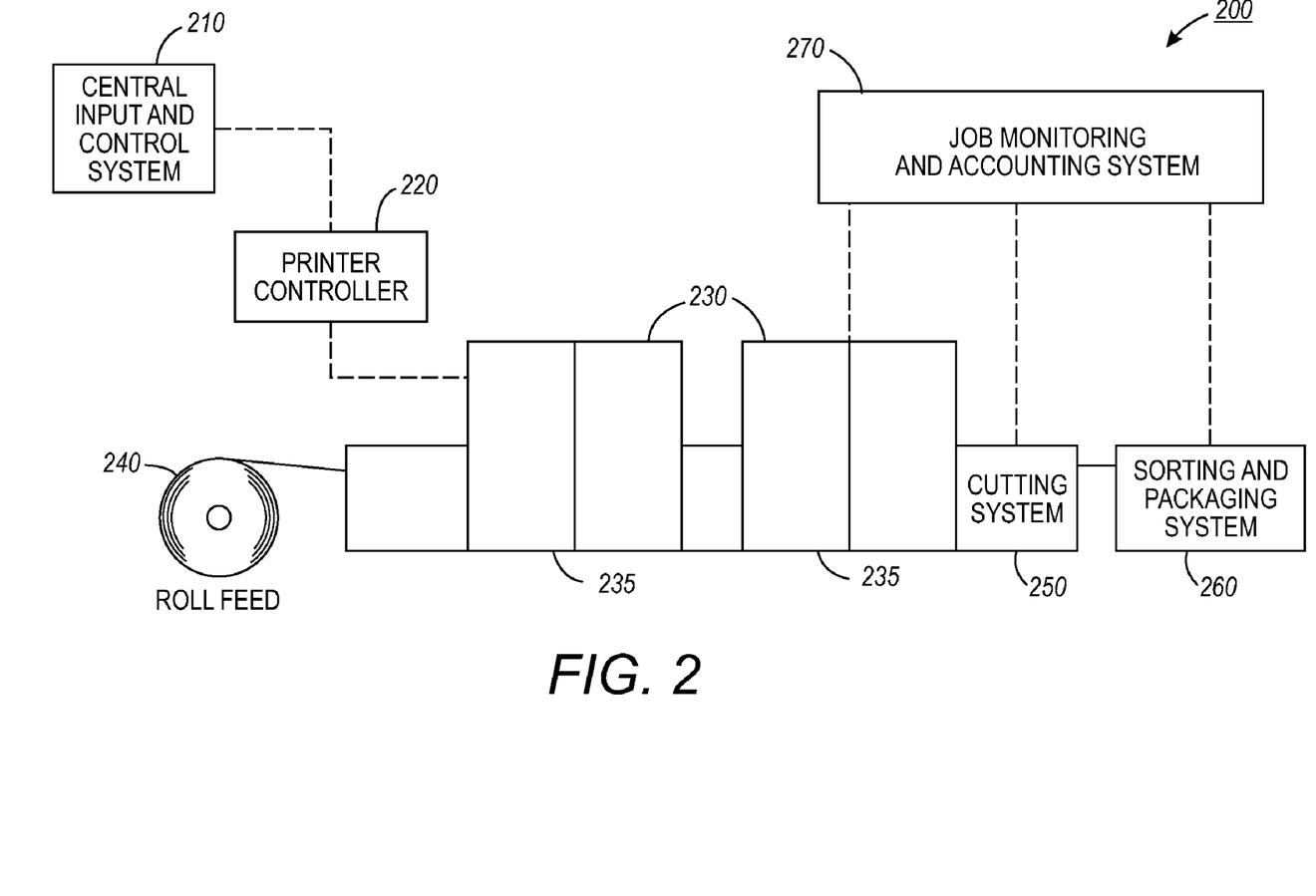
FIG. 2 illustrates an automated printing production system in accordance with an embodiment.

FIG. 2 illustrates an automated print production system 200 in accordance with an embodiment. The system 200 may be configured to promote throughput and efficiency for print production.

Job orders may be received and processed at the central input 210. As discussed above, job orders may be transmitted to central input 210 remotely via a network, such as the Internet. Central input 210 may also may configured to provide storage for jobs orders that will be repeated, or caching of print elements that can be used by other jobs, if necessary.

At such time that printing is desired, the print controller 220 is configured to initiate and control various printing aspects of a printer 230.

The print controller 220 may be located within, or associated with, the printer 230 and configured to generate control signals for printing. In some implementations, the print controller 220 may be a digital front end (DFE) as known in the digital printing arts. The control signals may include device-specific print information, such as, process color information (e.g., CMYK) information, or any other information useful for instructing a marking engine 235A, 235B of printer 230 to output an image on media.

In some implementations, the printer 230 may include one or more marking engines 235 that are configured for simplex (i.e., printing on single side) and/or duplex printing (i.e., printing on both sides) of the medium. For instance, as shown, two marking engines 235A, 235B, may be used in tandem such that as media passes through each printer, a separate side of the media is printed by one of marking engines 235A, 235B. In other embodiments, a Tightly Integrated Parallel Printer (TIPP) machine may be used. For example, a TIPP machine can have many integrated marking engines that can operate together as a single printer. Each marking engine on a TIPP machine can be addressed by a print controller that can iteratively adjust image output settings of the marking engines to achieve desired image output settings.

A media roll feed mechanism 240 may be configured to provide a continuous supply of media that may be cut to size and passed to the printer 230. The media may be any printable substrate, such as paper, parchment, a transparency, cardboard, plastic, film, fabric, foil, or any other printable media. Alternatively or additionally, sheet media may have been pre-cut and simply passed to the printer. Media may be designated by the customer or by default.

A cutting system 250 is positioned downstream of the printer 230 and configured to cut the printed items. This cutting defines the shape of the finished item. Various types of cutting devices may be used to separate the signs from the substrate media. For instance, the cutting system 250 may incorporate saws, dies, blades, laser cutting, punching, stamping, etc. In one implementation, the cutting system 250 may be a high speed laser cutting apparatus manufactured by LASX Industries, Inc.

A sorting and packaging system 260 may be provided downstream of the cutting system 250 that is configured to collect the cut, printed items. It may also be configured to accumulate, sort, stack and/or package them according to customer and location to be displayed. The information for determining this destination can be passed either from the central input 210, printer controller 220, or via barcode or other indicia that the finishing system 260 will interpret.

A job monitoring and accounting system 270 may be provided that is configured to track and/or control processing of each job. Depending on the processing operation(s) performed, customers' accounts may be adjusted accordingly. The job monitoring and accounting system 270 may also be configured to support the reprinting on any job set of output, if desired. In some implementations, the central input 210, the printer controller 220 and the job monitoring and accounting system 270 may be linked for communications therebetween.

The determination of composition may be based not only on a "best-fit" of the items to be printed based on items size and on media, but also on sort order and final display locations. The actual print order may be driven by final destination dependency and/or the most efficient layout composition for inventory.

Figure 3:
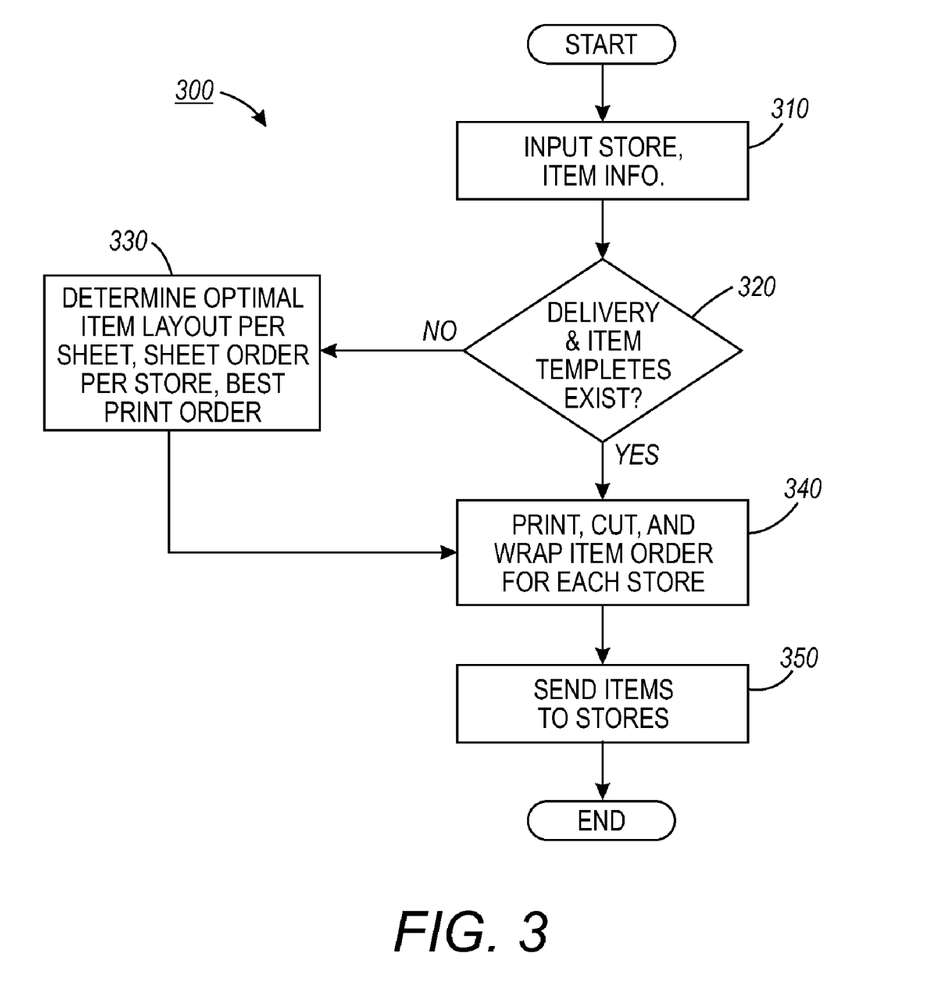
FIG. 3 illustrates an automated layout process in accordance with an embodiment.

FIG. 3 illustrates an automated layout process 300 in accordance with an embodiment.

In step 310, information from customers relating to store and item information is input, and includes, among other things, customer and/or locations of items to be displayed by the customer.

Next, in step 320, a determination is made as to whether delivery and item templates exist. These may have been submitted by customers, and/or retrieved from central input, if previously submitted. If not, in step 330, optimal layouts may be first determined. This may be preformed per sheet, sheet order per sheet, or best print order, as discussed in more detail with regards to FIG. 4, below.

In step 340, based on the delivery and item templates, the items may be printed, cut and packaged for each store and/or locations therein. In some implementations, the items may be shrink-wrapped and boxed for shipment.

Continuing to step 350, the packaged items are delivered to customers' stores. The items may be shipped to customers, for instance, by the United States Postal Service or private carrier, such as Federal Express, UPS, DHL, etc. In other implementations, the customers may choose to pick-up shipments of items (e.g., FOB) and/or use their own distribution networks.

Figure 4:
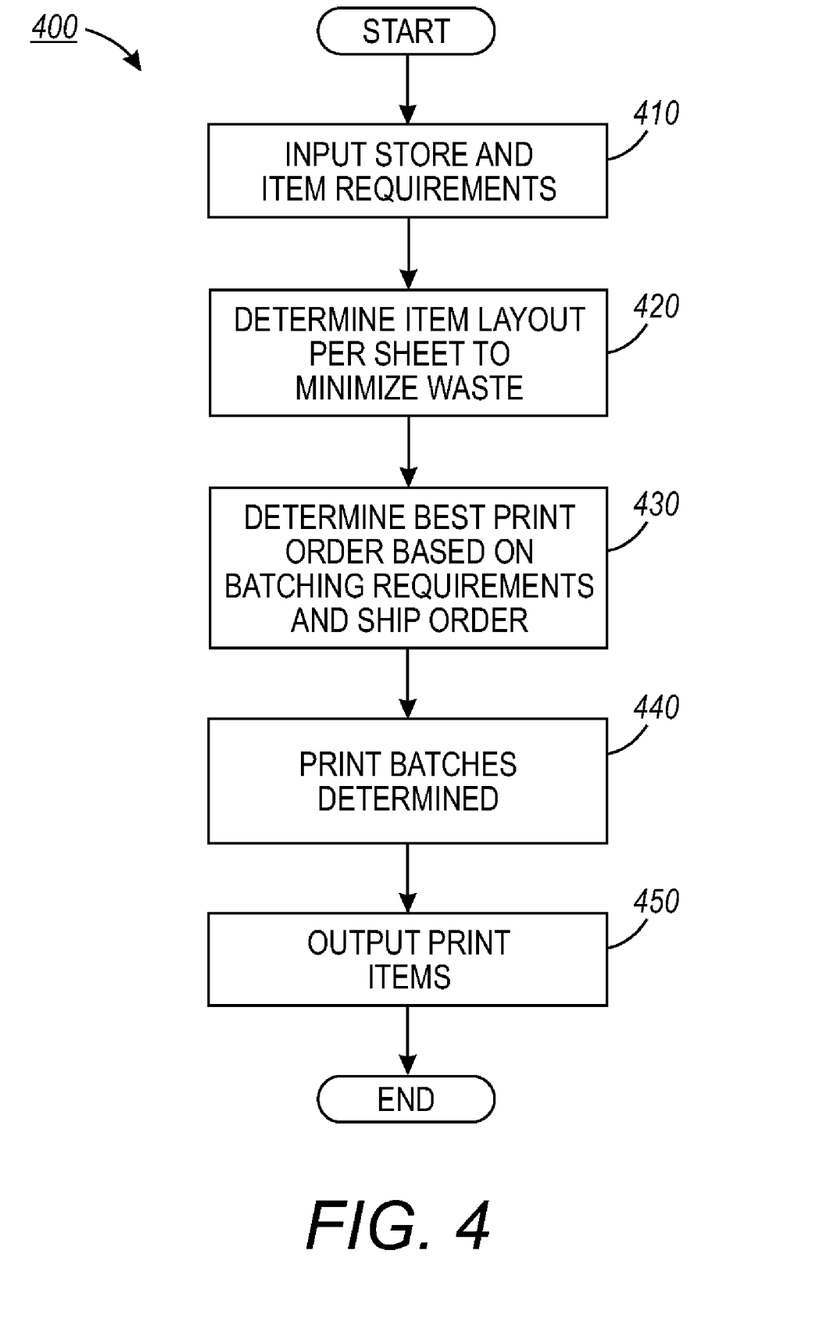
FIG. 4 illustrates a process for determining a print layout in accordance with an embodiment.

FIG. 4 illustrates a process 400 for determining a print layout for printed items in accordance with an embodiment.

In step 410, customers may input store and item requirements, such as the locations of the item to be displayed in the store. Continuing to step 420, a print layout may be determined to help minimize waste per sheet of media. A mapping functionality may be used that is configured to provide optimized material usage, not only at the sheet level by orientating items to be printed and cut out in a manner to reduce wastage, but also by providing fine tuning according to the job order's needs. For example, if there is just one store that needs a run of items that are different in shape but use the same material, then an algorithm may be used to define the cut pattern much is presently used to create jigsaw pieces from a single sheet. A primary difference, though, is that the algorithm does not have the choice of shape to use for each item/piece only the placement and rotation.

In one embodiment, an area ratio may be defined as the sum of the area of the items compared to the total useable area of the media available for printing, according to Equation 1. The total useable area may be sheet area (less any margins, cutlines, or other non-printable area).

$$\text{Area ratio} = \frac{1}{TotalArea}\sum ItemArea \tag{1}$$

Additionally, an area factor may be defined as the total usable area of actual items subtracted from the total area of each sheet time the number of sheets, according to Equation 2.

$$\text{Area Factor} = \text{Total Area} - \Sigma \text{ItemArea} \quad (2)$$

The lower the area factor value of Equation (2), the less material wasted. On the other hand, a higher value of the area ratio of Equation (1), i.e., nearing 1.0, indicates a more efficient use of material. A "tiling" algorithm may be used to optimize one or both of Equations (1) and (2), accordingly. Titling algorithm may be used to virtually flip, rotate, and/or place items to be printed on a media. In an iterative process, Equations (1) and/or (2) may be optimized to find a judicious layout of the items to be printed.

Next, in step 430, an optimal print order based on batch requirements and ship orders may be determined. One factor that may be considered is whether there are multiple stores needing the same items, but in different quantities. It may be, in some implementations, advantageous to print all of one store's items at one time and take advantage of cutting and stacking for a particular destination and display location. For example, all print items to be displayed on "Shelf #2" (or "Aisle #5") of a particular store may be boxed together, in order, as they are to be displayed in the store. This enables clerks in the store to efficiently display such items.

The layout may be based on an algorithm that includes one or more of the following: (i) number of stores; (ii) delivery requirements for each store; (iii) item order layout for each store; (iv) shape of each item; (v) size of each item; or (vi) material used for each item.

Control of the layout of the items to be produced enables an efficient use of media, such as sheet material. The layout control also enables patterns and types of items to be selected to reduce separation for distribution (e.g., print only items going to same location), or material (e.g., print all items that require the same media). These parameters may be determined by customers based on which approach produces the most value or meets their production goals.

In step 440, print batches are generated according to the layout that was determined in steps 420 and 430. Further, in step 450, the items are output for printing with one or more printers.

In some implementations, printed instructions may be included with packaging. The instructions may provide details as to specific locations the items are to be displayed and/or times when the items are to be put-up and taken down. As such, clerks may be more aware of the how to display the items when they are received.

Figure 5:
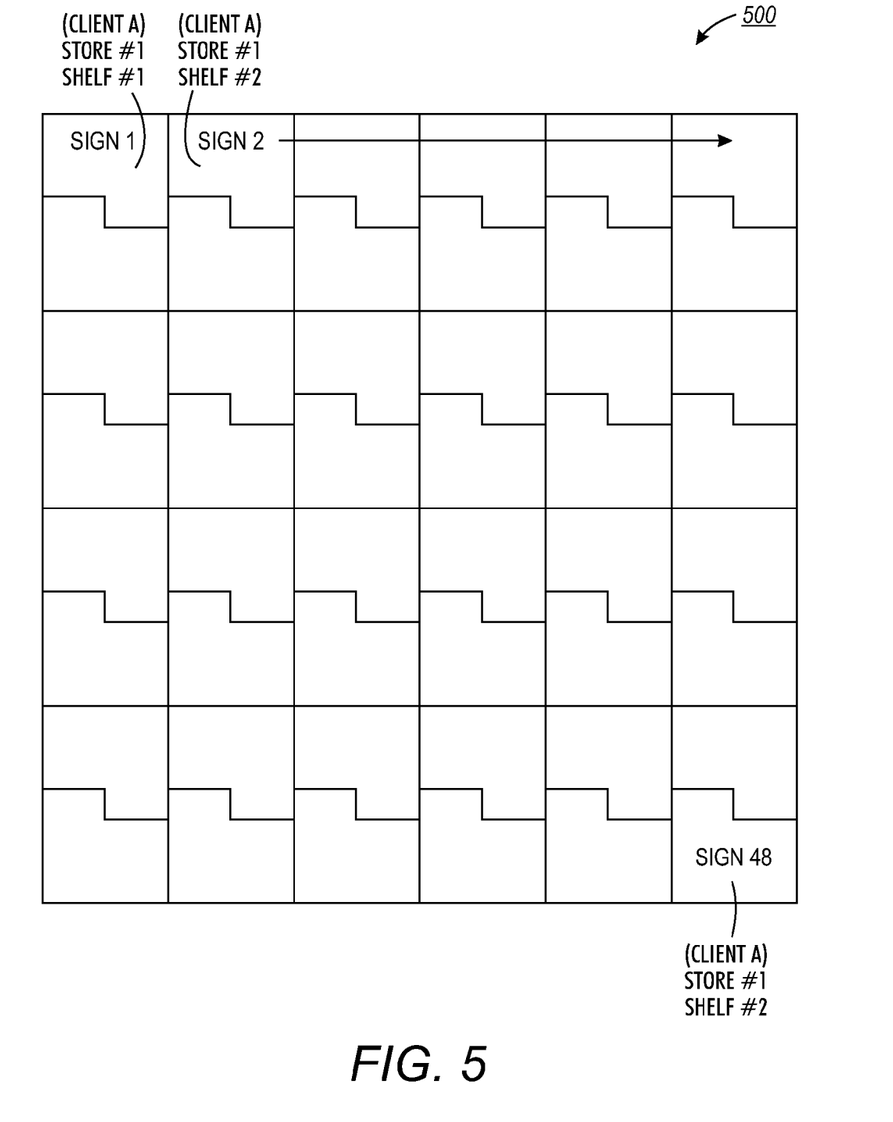
FIG. 5 illustrates an exemplary print layout in accordance with an embodiment.
Figure 6:
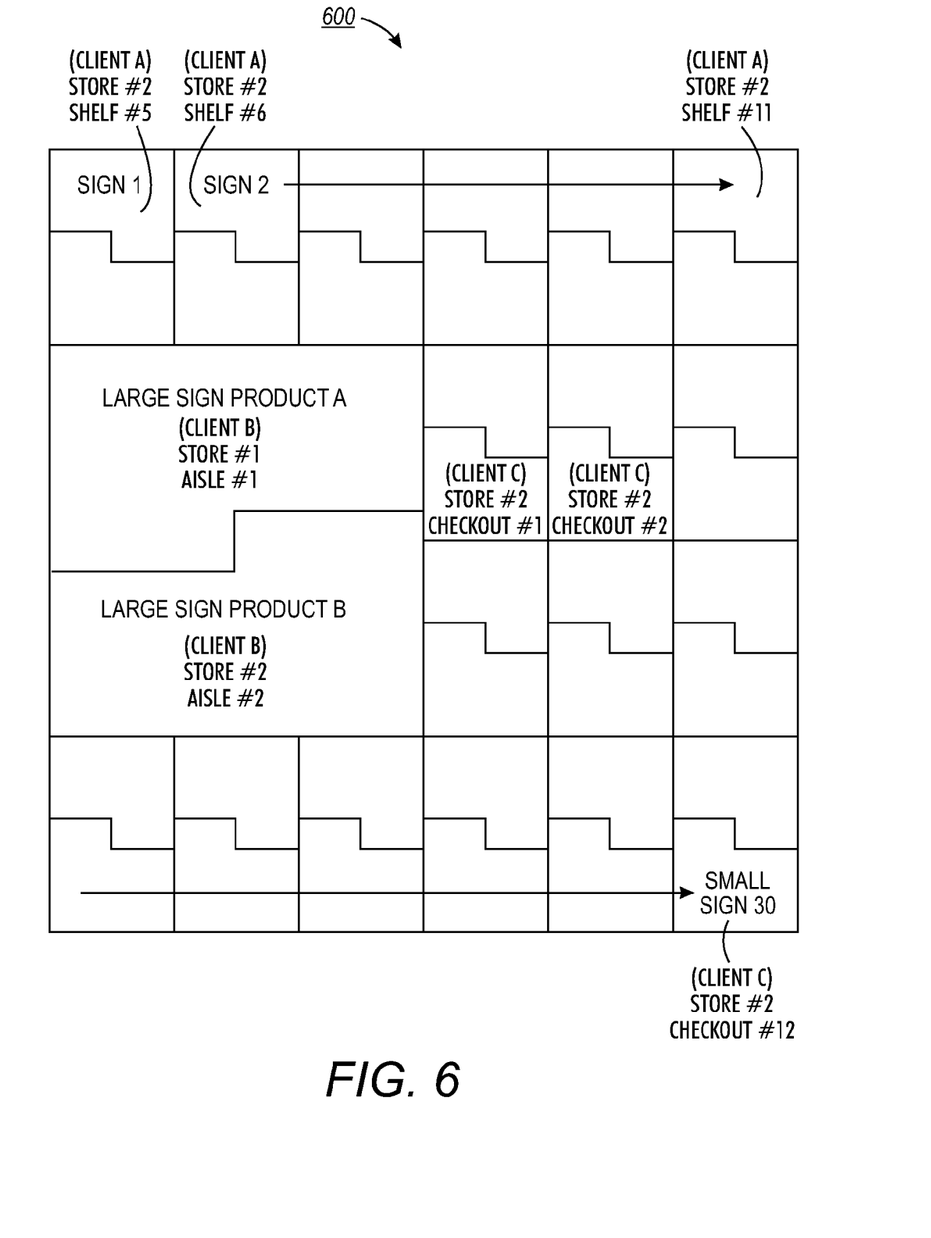
FIG. 6 illustrates another exemplary print layout in accordance with an embodiment.
Figure 7:
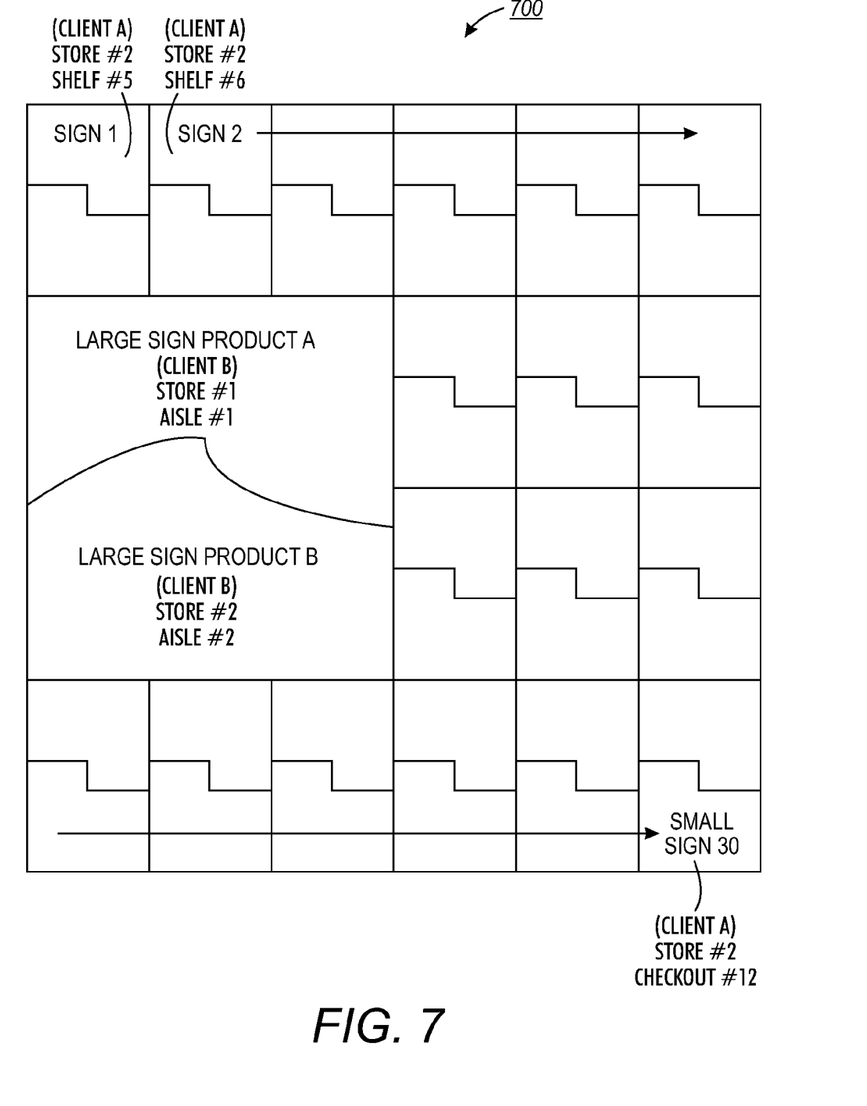
FIG. 7 illustrates yet another exemplary print layout in accordance with an embodiment.

FIGS. 5-7 show exemplary printed sign layouts according to various embodiments. The parenthetical elements, and those following the parenthetical elements may not actually appear on the printed sign, but are depicted for ease of discussion. These correspond to the customer and display location for a particular sign in a store.

FIG. 5 illustrates an exemplary print layout 500 of signs on a single sheet. In this example, 48 signs, each having generally the same shape and size, have been printed. As shown, adjacent signs may have a complementary shape, that allows them to more tightly fit together when printed. In this example, all items may be for the same customer, Client A. Similarly, the signs may be ordered as they are to be displayed.

FIG. 6 illustrates an exemplary print layout 600 of signs on a single sheet. In this example, there are two different sign configurations: small and large. The large and small signs have been generally grouped together to optimize space. In this case, the smaller signs are for customers Client A and Client C and the larger signs are for customer Client B. Generally, the signs have been grouped together by the various customers, Client A, Client B and Client C.

FIG. 7 illustrates yet another exemplary layout 700 of signs on a single sheet. In this example, there are two different sign configurations: small and large. The signs, however, may have an irregular or non-orthogonal outline, such as, Large Sign Products A and B. The smaller and larger signs have each been grouped together.

Figure 8A:
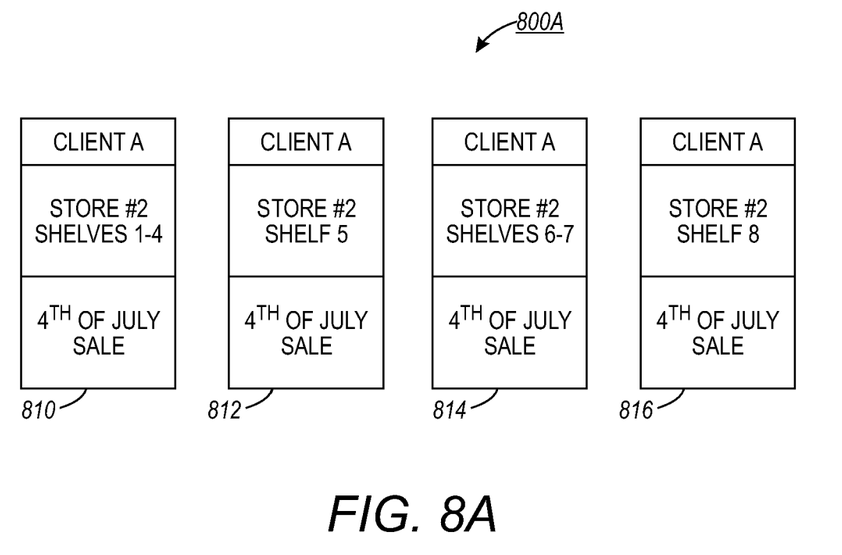
FIGS. 8(a) and 8(b) illustrate exemplary printed, sorted and packaged item orders, in accordance with an embodiment.
Figure 8B:
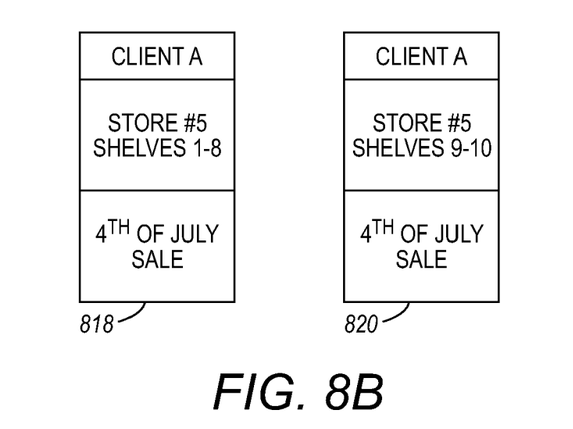

FIGS. 8(a) and 8(b) illustrate exemplary printed, sorted and packaged item orders, in accordance with an embodiment.

FIG. 8(a) shows an order 800A that includes four boxes of printed items that are packaged for delivery to Store #2 of Client A. Items to displayed on shelves #1-4 in Store #2 of Client A have been packaged in box 810, and items to be displayed on shelf #5 in Store #2 of Client A have been packaged in box 812. Similarly, items to be displayed on shelves #6-7 in Store #2 of Client A and packaged in box 814 and items to be displayed on shelf #8 in Store #2 of Client A are packaged in box 816. The boxes 810, 812, 814 and 816 may each be labeled "Fourth of July Sale," with instructions as to when and/or where the items are to be displayed.

FIG. 8(b) shows an order 800B that includes two boxes of printed items that are packaged for delivery to Store #5 of Client A. Order 800B may include items that generally correspond to those of order 800A, however, the display locations of the items is different in Store #2 and Store #5 of Client A. Of course, it will be appreciated that each store may also have unique orders.

Items to be displayed on shelves #1-8 in Store #5 of Client A are packaged in box 818. And items to be displayed on shelves #9-10 in Store #5 of Client A are packaged in box 820. These boxes 818, 820 may each be labeled "Fourth of July Sale," with instructions as to when and/or where the items are to be displayed.

Additional boxes of printed items for one or more other stores of Client A may be similarly handled. Likewise, other customers orders, such as, for one or more stores of Client B and Client C, may be handled in an analogous manner. In addition to boxes, other packaging might also be utilized.

According to one implementation, items with variable output shapes may be formed. These may include media of unusual shapes and may facilitate applications that require printed items to be folded and/or formed into "eye-catching" and/or structural shapes that can be used for signs or displays. In one embodiment, the production process may be used to produce signs, for instance, as disclosed in U.S. patent application Ser. No. 12/371,829, filed Feb. 16, 2009, titled "In-Store Marketing Sign," herein incorporated by reference in its entirety.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertain, and as may be applied to the essential features hereinbefore set forth and followed in the spirit and scope of the appended claims.

What is claimed is:

1. A printing system comprising:
   a printer configured to render items based on customer requirements;
   a sorting and packaging system configured to automatically sort and package printed items; and
   at least one processor configured to print, sort and package items based on predetermined physical locations within a customer's business establishment where the printed items are to be displayed,
   wherein the business establishment is a physical place of business where products are made, stored or sold or where services are provided, and
   wherein the size, the configuration, or a combination thereof of each print item is determined based on goods or services associated with the print item, the display location associated with the print item in the customer's business establishment, or both.

2. The system according to claim 1, further comprising a central input configured to receive and process print job orders from customers.

3. The system according to claim 1, wherein the predetermined physical locations comprise one or more of: a shelf, aisle, checkout station, door, window, or kiosk.

4. The system according to claim 1, wherein the sorting and packaging system comprises:
   a cutting system configured to cut and separate printed items;
   a sorting system configured to sort printed cut items by customer and location to be displayed; and
   a packaging system configured to package print jobs for shipment to the customer and location to be displayed.

5. The system according to claim 1, wherein the packaging system comprising a shrink-wrapping apparatus.

6. The system according to claim 1, further comprising a tracking and accounting system configured to monitor one or more processing operations.

7. The system according to claim 6, wherein the printer is configured to render a barcode, RFID tag, or indicia on sheet media including said items.

8. The system according to claim 7, further comprising: one or more sensors associated with one or more processing operations that are configured to read the barcode, RFID, or indicia and perform a processing operation in response thereto.

9. The system according to claim 1, wherein the printed items correspond to posters, signs, signage, tags, displays, documents, flyers or banners for products or services, sold or provided by the business establishment.

10. The system according to claim 1, wherein the size, the configuration or a combination thereof of each print item is determined using a look-up table that relates the size of the print item to goods or services associated with the print item, the display location associated with the print item in the customer's business establishment, or both.

11. A printing system comprising:
    a printer configured to render items based on customer requirements;
    a sorting and packaging system configured to automatically sort and package printed items; and
    a processor configured to print, sort and package items based on predetermined physical locations within a customer's business establishment where the printed items are to be displayed,
    wherein the processor is configured to determine a print layout based on an algorithm including one or more of the following: (i) number of stores; (ii) delivery requirements for each store; (iii) item order layout for each store; (iv) shape of each item; (v) size of each item; or (vi) material used for each item.

12. A printing system comprising:
    a printer configured to render items based on customer requirements;
    a sorting and packaging system configured to automatically sort and package printed items; and
    a processor configured to print, sort and package items based on predetermined physical locations within a customer's business establishment where the printed items are to be displayed, wherein the processor is configured to determine a print layout based on a parameter selected from the group consisting of an area ratio, an area factor, and a combination thereof.

13. A method of printing comprising:
    printing items based on customer requirements; and
    automatically sorting and packaging printed items,
    wherein printed items are automatically sorted and packaged items based on predetermined physical locations within a customer's business establishment where the printed items are displayed,
       wherein the business establishment is a physical place of business where products are made, stored or sold or where services are provided, and
       wherein the size, the configuration, or a combination thereof of each print item is determined based on goods or services associated with the print item, the display location associated with the print item in the customer's business establishment, or both.

14. The method according to claim 13, further comprising: receiving and processing print job orders from customers.

15. The method according to claim 13, wherein the predetermined physical locations comprise one or more of: a shelf, aisle, checkout station, door, window, or kiosk.

16. The method according to claim 13, wherein the sorting and packaging comprises:
    cutting and separating printed items; sorting printed cut items by customer and location to be displayed; and
    packaging print jobs for shipment to the customer and location to be displayed.

17. The method according to claim 13, further comprising: shrink-wrapping the printed items.

18. The method according to claim 13, further comprising: monitoring one or more processing operations using a tracking and accounting system.

19. The method according to claim 18, further comprising: rendering a barcode, RFID tag, or indicia on sheet media including said items.

20. The method according to claim 19, further comprising: reading the barcode, RFID tag, or indicia and perform a processing operation in response thereto.

21. The method according to claim 13, further comprising: including instructions in said packaging as to where the print items are to be displayed, when the print items are to be displayed, or both.

22. A method of printing comprising:
    printing items based on customer requirements; and
    automatically sorting and packaging printed items,
    wherein printed items are automatically sorted and packaged items based on predetermined physical locations within a customer's store where the printed items are displayed, further comprising: determining a print layout based on an algorithm including one or more of the following: (i) number of stores; (ii) delivery requirements for each store; (iii) item order layout for each store; (iv) shape of each item; (v) size of each item; or (vi) material used for each item.

23. A method of printing comprising:
printing items based on customer requirements; and
automatically sorting and packaging printed items,
wherein printed items are automatically sorted and packaged items based on predetermined physical locations within a customer's store where the printed items are displayed, further comprising: determining a print layout based on a parameter selected from the group consisting of an area ratio, an area factor, and a combination thereof.

* * * * *